United States Patent [19]

Holmstadt et al.

[11] 4,293,041

[45] Oct. 6, 1981

[54] POWER CULTIVATOR WITH DEBRIS EXCLUDING BARRIER AND SCRAPER

[75] Inventors: Ronald J. Holmstadt, Bloomington; Robert C. Comer, Hopkins, both of Minn.

[73] Assignee: The Toro Company, Minneapolis, Minn.

[21] Appl. No.: 39,944

[22] Filed: May 17, 1979

[51] Int. Cl.³ .................. A01B 1/06; A01B 33/06
[52] U.S. Cl. ...................... 172/39; 172/41; 172/608; 172/610
[58] Field of Search .............. 172/39, 41, 42, 43, 172/49, 59, 81, 111, 125, 526, 547, 558, 559, 606, 608, 610; 56/DIG. 24

[56] References Cited

U.S. PATENT DOCUMENTS

| 1,996,676 | 4/1935 | Hargrave | 172/558 |
|---|---|---|---|
| 2,333,153 | 11/1943 | Crow | 56/DIG. 24 X |
| 2,888,084 | 5/1959 | Trecker | 172/41 |
| 3,031,018 | 4/1962 | Smithers | 172/41 |
| 3,351,140 | 11/1967 | Gandrud | 172/606 |
| 4,133,389 | 1/1979 | Ruhl et al. | 172/41 |
| 4,161,987 | 7/1979 | Tolmer | 172/610 X |

FOREIGN PATENT DOCUMENTS

| 2336872 | 1/1974 | Fed. Rep. of Germany | 172/59 |
|---|---|---|---|
| 2256807 | 5/1974 | Fed. Rep. of Germany | 172/608 |
| 2410581 | 9/1974 | Fed. Rep. of Germany | 172/59 |

Primary Examiner—Richard T. Stouffer
Attorney, Agent, or Firm—James W. Miller

[57] ABSTRACT

A hand-held power driven cultivator incorporating a pair of ground working implements or tillers mounted on a pair of laterally spaced vertical shafts depending from a motor and drive train enclosing housing. The tillers are counter-rotated and include interdigitating tines which engage and move the earth forwardly. A barrier freely surrounds each tiller supporting and driving shaft, and completely encloses the shaft between the tiller and the overlying housing. A scraper blade is associated with each barrier and includes a scraping edge spaced slightly from the barrier so as to enhance the ability of the barrier to repel or prevent the accumulation of weeds, roots, debris, and the like. Support and manipulation of the housing is provided for by an elongated handle including an upper fixed hand grip and power switch, and a lower adjustable hand grip.

9 Claims, 9 Drawing Figures

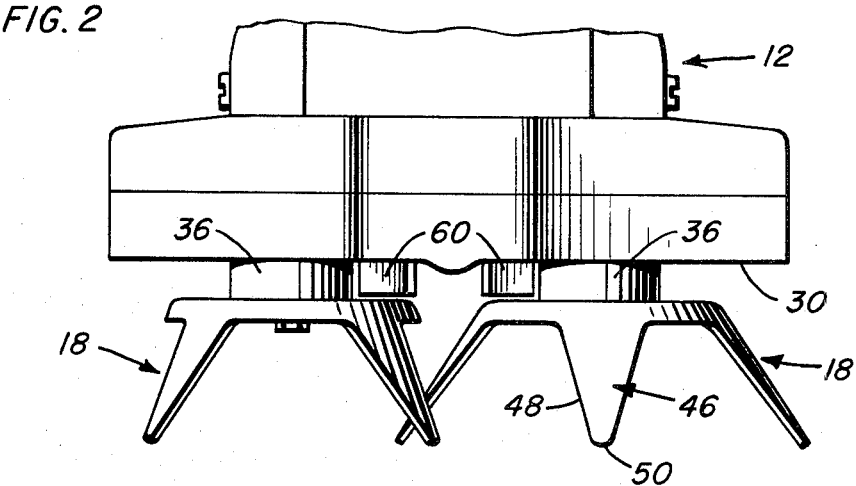
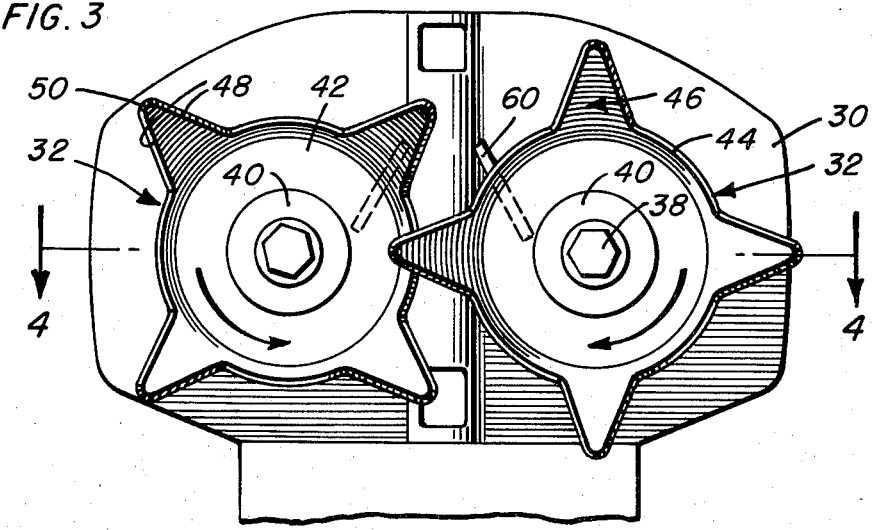
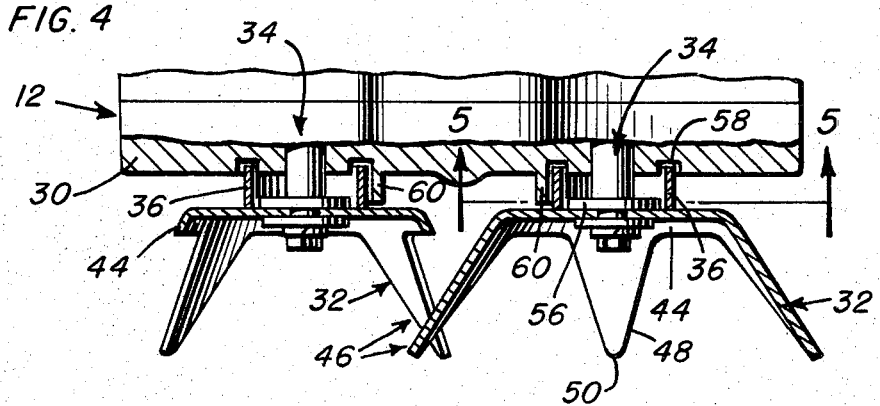

POWER CULTIVATOR WITH DEBRIS EXCLUDING BARRIER AND SCRAPER

BACKGROUND OF THE INVENTION

The present invention is generally concerned with home garden tools, and more specifically, relates to powered hand-held devices particularly adapted for soil cultivation.

Such ground working tools, known by a variety of descriptive names, including cultivator, weeder, hoeing machine, and the like, have been the subject of patents for a substantial number of years as will be recognized from the following patents, a number of which are specifically directed to powered hand-held devices: U.S. Pat. Nos. 369,600, Hicks, September 1887; 1,592,825, Gardner et al, July 1926; 2,625,867, Hands, Jr., January 1953; 3,616,862, Van Der Lely, November 1971; 4,003,436, Foster et al., January 1977; 4,133,389, Ruhl et al, January 1979; 1,800,229, Germany, May 1970; 530,635, Italy, July 1955; 379,225, U.S.S.R., June 1973; 386,596, U.S.S.R., August 1973.

The patent to Ruhl et al presents a hand-held power driven cultivator wherein a pair of angled tillers are mounted below the housing on a pair of exposed shafts. The individual blades or tines of the tillers may pass alternately across the center line of the cultivator as the tillers move in a counter-rotational direction tending to pull the cultivator forwardly. No provision is made for preventing the winding of weeds, roots, or other debris about the exposed tiller shafts, nor does there appear to be any particular concern with any problems which might arise with regard to a clogging of the tillers, particularly in those instances wherein they may pass across the center line of the cultivator. The two Russian patents, as well as the patent to Gardner et al, also disclose inclined tillers and tiller shafts, while the remainder of the patents present devices with vertical shafts. In each instance, there appears to be little or no provision for preventing debris accumulation around the shaft. The only suggestion of this problem is in the patent to Foster et al wherein specific provision is made to oscillate the tilling members through a relatively small angle to prevent the wrapping of roots and growth around the tines. It is doubtful whether this oscillating movement will provide the superior cultivating action achieved by rotating tillers, and in particular tillers presented in pairs and driven in counter-rotational directions.

SUMMARY OF THE INVENTION

The power cultivator of the present invention incorporates features which, individually and in combination, provide a superior product over what has heretofore been proposed.

Of particular significance is the provision of a unique barrier for effectively preventing the winding of roots, weeds, grass, and the like, about the exposed tiller shafts, excluding the buildup of debris between the tiller and housing, and preventing any tendency for the debris moving along the shaft into the housing itself.

This protective barrier is provided for by the mounting of a collar-like member about each shaft. The member will extend from the upper surface of the tiller to the undersurface of the overlying housing, and preferably into an annular recess provided in the housing so as to provide a complete enclosure for the shaft. In order to reduce any tendency for weeds and the like adhering to the member, it is to be freely rotatable independently of the tiller and relative to the tiller, shaft and housing. Further, a pair of scrapers may depend from the undersurface of the housing with the scrapers including scraping edges positioned immediately adjacent the barrier members for cooperation therewith in insuring the prevention of any buildup of vegetation or debris thereabout.

Each of the tillers is preferably provided with four downwardly and outwardly inclined tapered tines which interdigitate upon a counter-revolution of the two tillers in a direction so as to discharge forwardly and centrally along the path of use and away from the operator. The use of four tines is considered significant in that a maximum ground working effect can be achieved, while at the same time providing sufficient spacing so as to avoid clogging. This in turn eliminates the necessity of providing for a reversing of the tillers to free the clogged material, thus enabling the use of a less complex motor and/or power train. If, however, particular circumstances dictate, an appropriate reversing motor can be used.

It is to be appreciated that the tool, while principally referred to as a cultivator, is intended to perform a variety of related ground working functions, such as weeding, earth turning, hoeing, aerating, and the like. Further, while it is contemplated that an electric motor, utilizing line current, be used, other sources of power, such as a gasoline engine or battery-powered motor, may be used.

Additional objects and advantages of the invention are considered to reside in the details of construction and operation as more fully hereinafter described and claimed.

BRIEF DESCRIPTION OF DRAWINGS

FIG. 2 is an enlarged front elevational view of the lower portion of the housing and the pair of tiller assemblies depending therefrom;

FIG. 3 is a bottom plan view of the tiller assemblies and overlying portion of the housing;

FIG. 4 is a cross-sectional detail through the tiller assemblies taken substantially on a plane passing along line 4—4 in FIG. 3;

DESCRIPTION OF PREFERRED EMBODIMENTS

Figure 1:
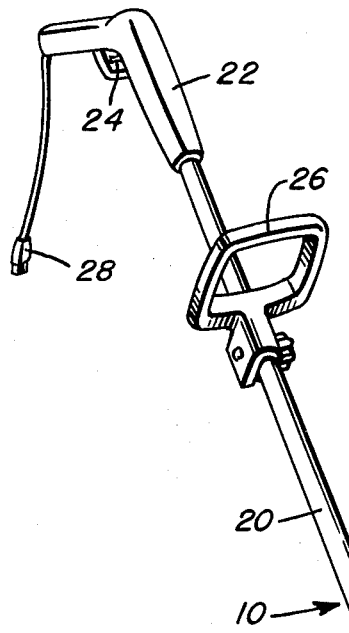
FIG. 1 is a perspective view of the hand-held cultivator comprising the present invention.

Referring now more specifically to the drawings, reference 10 is used to generally designate the cultivator comprising the present invention. This cultivator 10 includes a housing 12 enclosing a motor 14 and a gear power train 16 operationally engaged between the motor 14 and a pair of depending tiller assemblies 18.

The tool is manipulated by means of an elongated hollow tubular handle 20 engaged with the housing and projecting upwardly at an angle therefrom. A pistol-type hand grip 22 is provided at the upper end of the handle, normally having an actuating switch 24 associated therewith. A second loop-type hand grip 26 is adjustably mounted on the handle 20 for selective positioning therealong and thereabout for the convenience of the individual user. Assuming the use of an electric motor, the hollow tubular handle 20 will normally accommodate the conductor cable which will terminate in an exposed male plug 28 for engagement, through an appropriate extension cord, to a source of line power. It is preferred that the base or bottom wall 30 of the housing 12 be positioned generally parallel to the ground surface during the operation of the tool 10, and accordingly, the angle of the handle 20 relative to the housing will be such so as to facilitate this desired positioning of the housing.

Figure 6:
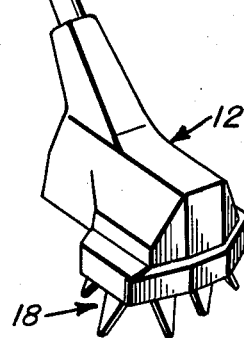
FIG. 6 is an exploded perspective view of the components of a tiller assembly.

Referring now to the tiller assemblies 18, attention is particularly directed to FIGS. 4 and 6. These assemblies duplicate each other and comprise, in each instance, a tiller 32, a tiller shaft 34, a shaft surrounding barrier 36, a mounting bolt 38, and appropriate washers 40.

The tiller, in the preferred form thereof, includes a flat circular disc 42 having an integral downwardly angled peripheral lip 44 thereabout. Four equally spaced downwardly and outwardly angled tines 46 form integral continuations of the lip 44, with the lip both rigidifying the disc and greatly strengthening the juncture of the tines and the disc. Each of the tines is provided with opposed downwardly converging edges 48 which terminate in a lower slightly rounded point 50. In horizontal cross-section, each of the tines 46 follows the general curvature of the peripheral edge of the disc and lip thereabove. This configuration provides an effective working of the soil in conjunction with a smooth operation which enhances the physical handling of the cultivator 10.

The tiller 32 is fixed to the lower end of the corresponding tiller shaft 34 in a non-rotating manner by means of a non-circular or oblong aperture 52 provided centrally through the disc 42 which receives the similarly configured lower end 54 of the tiller shaft 34. Immediately above the lower end 54 of the shaft 34, and providing an enlarged support surface for the disc 42, is a flat annular plate 56 integral with, or otherwise affixed to, the shaft 34. The mounting of the tiller is completed by the bolt 38 threaded upwardly through washers 40, through the disc aperture 52, and into a downwardly opening threaded bore in the tiller shaft 34. The washers 40 can consist of an enlarged load spreading washer and an appropriate lock washer as suggested in the drawings. When mounted in this manner, it will be appreciated that the tiller 32 is fixed to the shaft 34 for rotation therewith, and yet affords easy access for replacement of the tillers when necessary.

The tiller shaft 34 projects upwardly through the base or bottom wall 30 of the housing 12 and, within the housing, is engaged with the power train 16 for a rotational driving of the shaft and associated tiller assembly. Inasmuch as the tiller 32, or more particularly the top disc 42 thereof, cannot be positioned flush against the undersurface of the housing base, a length of the tiller shaft 34 would normally be exposed, as is in fact the case with the tiller shafts of the prior art devices. Such an exposed portion of the shaft provides an area readily susceptible to the accumulation of debris, particularly weeds, roots, and the like, which tend to wind about the shaft, clogging and jamming the tiller assemblies, and even possibly entering into the housing. This particularly vexing problem is avoided in the present invention by the utilization of the annular barrier 36. This collar-like barrier 36, which is of a hollow cylindrical construction, is freely received about the exposed portion of the shaft 34 and, in the vertical operational position of the cultivator 10, rests freely on the upper surface of the tiller disc 42 in slightly outwardly spaced surrounding relation to the circular plate 56 fixed to the shaft 34. The upper annular edge of the barrier 36 is received within an annular groove or recess 58 formed in the lower surface of the base or bottom wall 30 of the housing 12. The cross-sectional width of the recess 58 is such so as to freely receive the upper edge of the barrier 36. The depth of the recess is configured such that the upper edge of the barrier 36 is not in continuous engagement with the inner wall or bottom of the recess in the operational position of the cultivator, notwithstanding that this upper edge of the barrier 36 projects into the recess above the lower surface of the housing base 30. Arranged in this manner, it will be appreciated that the barrier 36 isolates the rotating shaft 34 from any weeds, roots, or the like, which may be encountered during the use of the cultivator 10. Further, while the barrier 36 may tend to rotate from frictional engagement with the upper surface of the rotating tiller 32, such rotation will be erratic, discontinuous, and readily halted by the encountering of any resistance, such as engagement with ground materials. In this manner, there will be little or no tendency for any material to accumulate on the barrier 36 itself, and at the same time, no possibility of the accumulation of materials on the shaft 34. By the same token, the barrier 36 will, by effectively excluding material from the shaft 34, also prevent the movement of such material along the shaft and into the housing. Finally, it will be noted that the annular recess 58 and the shaft mounted plate 56 cooperate to position and properly retain the barrier 36 about the shaft 34.

While the accumulation of debris on the barrier 36 and the top of the tiller disc 42 is unlikely due to the "free" mounting of the barrier, the present invention also contemplates the provision of a scraper or scraper blade 60 mounted on and depending from the undersurface of the base 30 of the housing 12. This scraper, if desired, can be formed integrally with the base. The scraper 60 is angled toward the barrier 36, opposite the direction of rotation of the tiller 32 as indicated by the direction arrow in FIG. 3, with the inner edge of the scraper 60 being positioned closely adjacent the outer surface of the barrier 36, spaced sufficiently therefrom to avoid interference with the movement thereof, and close enough so as to prevent any accumulation of debris thereon. The spacing of the lower edge of the scraper from the top of the tiller disc 42 also is such so as to both allow free rotation and prevent debris accumulation.

It is to be appreciated that the above-detailed description of the tiller assembly 18, associated scraper 60, the mounting thereof, and the manner of operation, applies equally to both of the tiller assemblies 18, the only difference between the assemblies being in the counter-rotational nature thereof. This counter-rotational arrangement will be readily noted from the direction arrows in FIG. 3, as well as the arrangement of the power train in FIG. 7, as shall be discussed subsequently.

With continued reference to the counter-rotational operation of the tiller assemblies 32, it will be noted that the shafts 34 of the assemblies are provided in laterally spaced parallel relation to each other and depend perpendicularly from the base 30 of the housing 12. The space between the shafts 34, and the rotational position of the tillers thereon, provides for an interdigitation of the tines 46 along the center line of the housing. It is contemplated that the tiller rotation be such so as to effect a forward discharge of the tilled material along the center line of the cultivator. In this manner, there will be a minimum of lateral discharge of the tilled material. Further, when using the cultivator 10 as one would use a conventional hoe or rake, by a forward positioning of the cultivator and a rearward drawing thereof, there is, because of the forward discharge of the material, a natural tendency to re-engage at least a portion of the previously tilled material to further pulverize or till this material, thus increasing the effectiveness of the cultivator. Incidentally, it should also be appreciated that by providing for a coplanar horizontal orientation of the two tillers, all of the tines thereof are in constant engagement with the earth, thereby avoiding any erratic movement and loading thereof such as might be experienced were the tines to periodically engage with and disengage from the earth, as in the case in those implements wherein the tillers are oriented at an angle to the horizontal.

The use of four tines on each tiller is also considered of particular significance in that four tines, in an interdigitating arrangement, as proposed herein, are considered sufficient so as to achieve a maximum cultivation of the soil, while at the same time avoiding any tendency for a clogging of the tillers due to an accumulation of earth materials between the interdigitating tines. The particular shape and orientation of the tines 46 are considered to both enhance the tilling ability thereof and reduce any tendency for a clogging in that the spacing between the tines, whether on the same tiller or on the adjoining tillers, increases downwardly due to the tapered sides, thus providing for a ready downward discharge of material.

Figure 8:
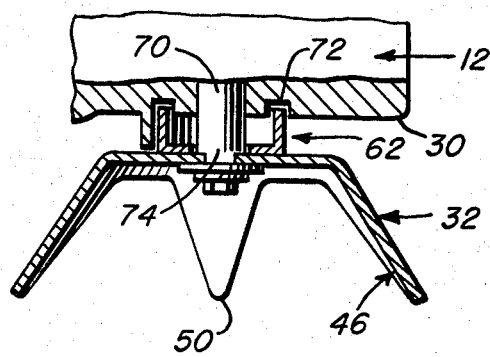
FIG. 8 is a cross-sectional detail through the tiller assembly illustrating a modified form of barrier.
Figure 9:
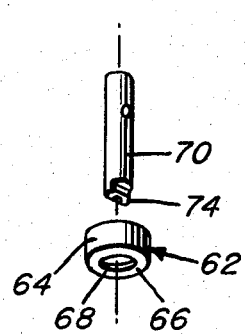
FIG. 9 is an exploded perspective view of the modified barrier and an associated tiller shaft.

Turning now particularly to FIGS. 8 and 9, a modified barrier 62 has been illustrated therein. This barrier 62 is of a generally cup shape including an annular collar or wall 64 and an integral flat base or bottom 66. The base 66 includes a central aperture 68 therethrough which freely receives the tiller shaft 70. This shaft 70 differs from the previously described shaft 34 in that the circular positioning plate 56 has been eliminated, the barrier 62 being self-centering on the shaft 70 by the apertured base 66. In addition, as with the barrier 36, the upper end of the barrier 62 is received within an annular bottom recess 72 provided in the undersurface of the base 30 of the housing 12. The lower end of the shaft 70 is notched and provided with a non-rectangular, or oblong, projection 74 which conforms to and is received through the central aperture 52 on the previously described tiller 32 for a mounting of the tiller 32 on the shaft 70 as previously described with regard to the mounting on the shaft 34. As will be appreciated, the depth of the mounting projection 74 on the shaft 70 is such so as to, upon a tightening of the mounting bolt, firmly clasp the tiller 32 to the shaft end.

Figure 7:
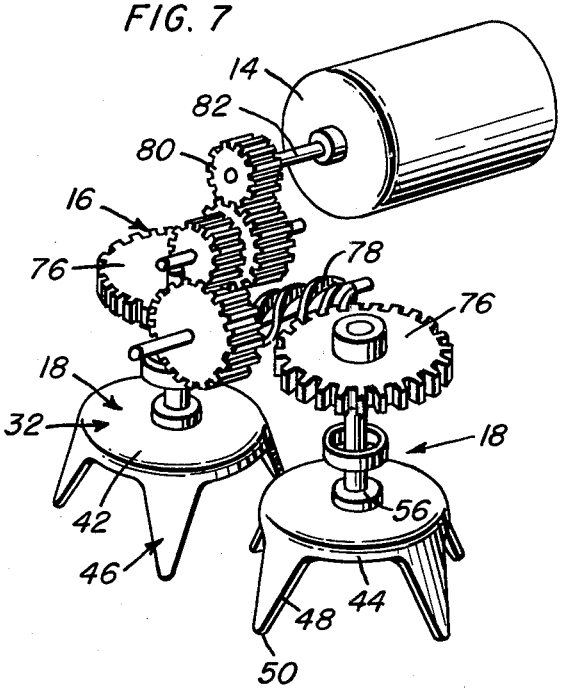
FIG. 7 is a general schematic perspective illustration of the major components of the power train.
Figure 5:
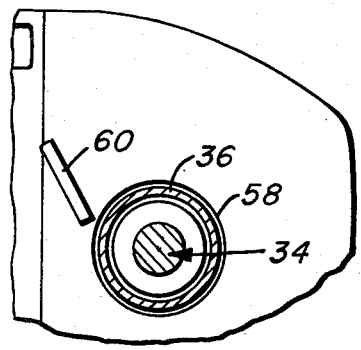
FIG. 5 is a cross-sectional detail taken substantially on a plane passing along line 5—5 in FIG. 4.

Turning now to the power train 16 as generally illustrated in FIG. 7, it will be noted that a pair of worm gears 76 are mounted on the inner ends of the tiller shafts. These worm gears are engaged and driven, in a counter-rotational direction, by a common centrally located shaft mounted worm 78. The driving of the worm shaft is in turn effected, through a series of meshed gears, from a spur gear 80 mounted on the drive shaft 82 of the motor 14. The specific details of the gears, gear shafts and mounting means therefore may vary, and have not been specifically illustrated.

The foregoing is considered illustrative of the principles of the invention and the preferred embodiment. It is to be understood that it is not desired to limit the invention to the exact construction and operation shown and described, and that all suitable modifications and equivalents may be resorted to falling within the scope of the invention as claimed.

We claim:

1. A hand held power driven ground working tool, which comprises:
(a) a housing having an upwardly extending handle suited to be held by an operator;
(b) an elongated rotatably mounted shaft projecting vertically downwardly from the housing;
(c) a ground working head fixed on the shaft, exteriorly of the housing, for rotation therewith, the working head being oriented on the lower end of the shaft with the housing thereabove;
(d) power means within the housing engaged with the shaft for a rotational driving of the shaft and the working head thereon;
(e) barrier means extending between the working head and the housing, the barrier means freely and rotatably surrounding the shaft in outwardly spaced relation thereto with the shaft being independently rotatable relative to the barrier means, wherein the barrier means comprises an annular member of a length substantially coextensive with the length of the shaft between the working head and the housing, wherein the annular member rests by gravity on top of the working head and has sufficient frictional engagement with the working head to be rotated thereby until debris engages the annular member to prevent rotation thereof; and
(f) scraper means fixed to the housing and projecting inwardly toward the annular member between the working head and the housing, the scraper means including an inner edge positioned in closely spaced relation to the annular member for effecting a scraping action against the annular member during rotation of the member precluding accumulation of debris thereon.

2. The tool of claim 1 wherein said housing has a lower surface, a recess defined in said lower surface about said shaft, said recess having an inner wall, said annular member being freely received within said recess, said member being of a length greater than the distance between the working head and the lower surface of the housing, and less than the distance between the working head and the inner wall of the recess, said member, in the normal operative position of the shaft, completely enclosing said shaft between the working head and the lower surface of the housing.

3. The tool of claim 2 wherein said annular member includes a disc-like lower end with a central aperture therethrough freely receiving said shaft, and a collar on and projecting upwardly from the outer periphery of said disc-like lower end.

4. In a ground working tool, a housing having a bottom wall; at least one output shaft rotatably mounted within said housing and projecting through said bottom wall; power means engaged with each shaft within said housing for a power driving thereof; a working head mounted on each shaft in outwardly spaced relation to the bottom wall of the housing; barrier means positioned about each shaft in outward spaced relation thereto between the working head and the housing bottom wall to preclude the accumulation of debris on the shaft, wherein the barrier means comprises a freely rotatable collar-like member having a lower end adjacent said working head and an upper end adjacent said housing bottom wall, wherein the collar-like member in the operative position of the tool completely encloses the shaft between the working head and the housing bottom wall; and further including a scraper fixed to the housing bottom wall adjacent each shaft, said scraper including an edge positioned in closely spaced relation to the associated collar-like member for precluding the accumulation of debris thereon, wherein each scraper is provided with a second edge overlying the associated working head in closely spaced relation thereto for precluding the accumulation of debris thereon.

5. The tool of claim 4 including positioning means to retain said collar-like member generally concentric about the associated shaft.

6. The tool of claim 5 wherein said positioning means includes a disc-like member positioned between said shaft and said collar-like member generally in the plane of the lower end of the collar-like member.

7. The tool of claim 6 wherein said disc-like member is secured to said shaft and has an outer periphery in closely spaced relation to said collar-like member.

8. The tool of claim 6 wherein said disc-like member is secured to said collar-like member and has a central aperture defined therethrough, said aperture closely yet freely receiving said shaft therethrough.

9. The tool of any of claims 5 or 6 wherein said positioning means includes an annular recess defined in the housing bottom wall about each shaft, the upper end of the associated collar-like member being freely received in the recess.

* * * * *